United States Patent [19]
Cady et al.

[11] Patent Number: 5,343,736
[45] Date of Patent: Sep. 6, 1994

[54] OPTICAL LEAK SENSOR AND POSITION DETECTOR

[75] Inventors: Byron C. Cady, Gilroy; Carl E. Story; David A. Guerra, III, both of Cupertino, all of Calif.

[73] Assignee: Systems Chemistry, Inc., Milpitas, Calif.

[21] Appl. No.: 899,663

[22] Filed: Jun. 15, 1992

[51] Int. Cl.⁵ ............................................. G01M 3/04
[52] U.S. Cl. .............................................................. 73/40
[58] Field of Search ............... 340/619, 605; 73/40, 73/46

[56] References Cited

U.S. PATENT DOCUMENTS

| | | | |
|---|---|---|---|
| 4,569,220 | 2/1986 | Hopfe et al. | 73/714 |
| 4,602,249 | 7/1986 | Abbott | 340/605 |
| 4,745,293 | 5/1988 | Christensen | 340/619 |
| 4,764,671 | 8/1988 | Park | 340/619 |
| 4,899,585 | 2/1990 | Kulha | 340/619 |
| 4,901,751 | 2/1990 | Story et al. | 137/312 |
| 4,932,388 | 6/1990 | Chiba et al. | 123/613 |
| 4,961,069 | 10/1990 | Tsaprazis | 340/619 |
| 5,062,770 | 11/1991 | Story et al. | 417/46 |

*Primary Examiner*—Hezron E. Williams
*Assistant Examiner*—Daniel S. Larkin
*Attorney, Agent, or Firm*—Robert O. Guillot

[57] ABSTRACT

Optical leak sensor and position detector including a generally hollow body having a sealed forward end that is designed to be mounted in an opening formed within a fluid handling device such as a pump or valve. Disposed within the hollow body of the sensor are a liquid leak detection optical system and a motion sensing optical system. In the preferred embodiment, the optical sensing systems are removably engaged within the hollow body, such that the hollow body can remain inserted within the fluid handling device, whereby the device can remain operational and the optical components can be removed, checked and replaced if need be.

18 Claims, 2 Drawing Sheets

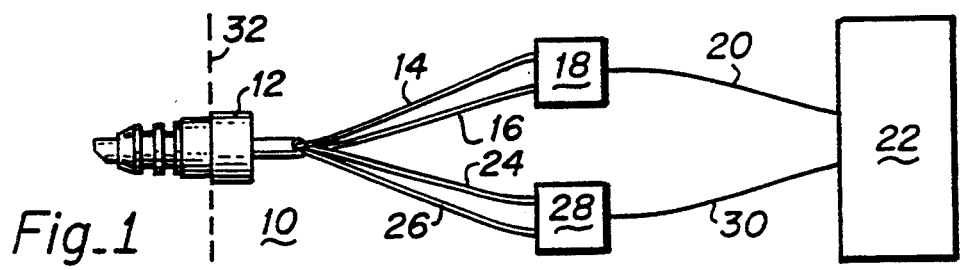
Fig_1
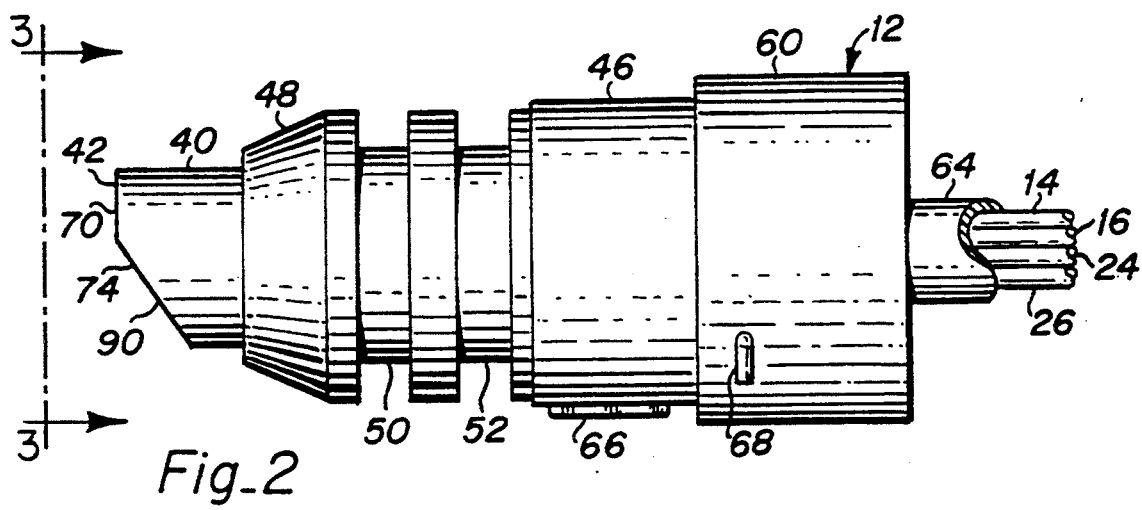
Fig_2
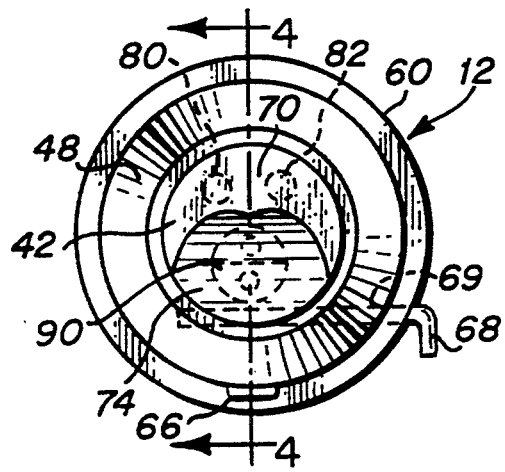
Fig_3
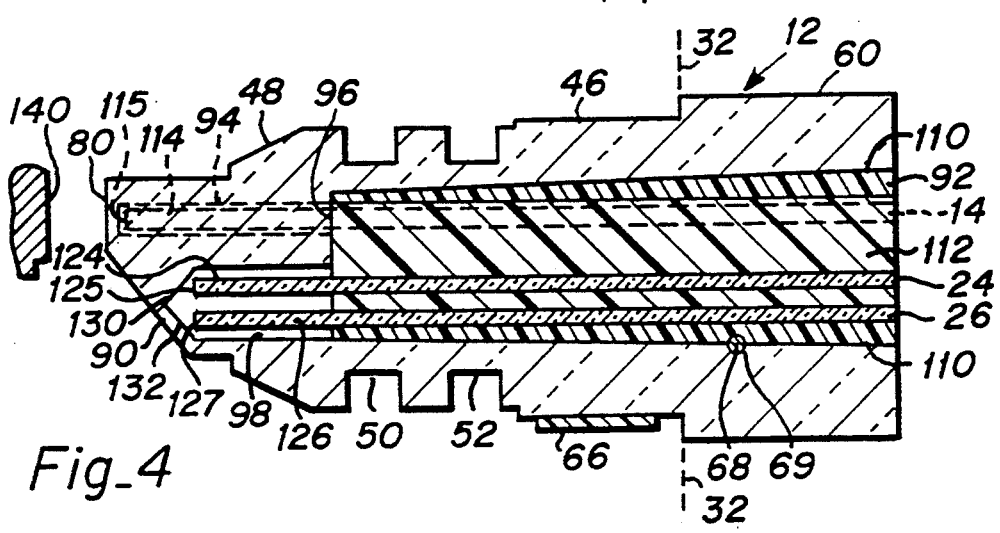
Fig_4

OPTICAL LEAK SENSOR AND POSITION DETECTOR

BACKGROUND OF THE INVENTION

1. Field of the Invention

This invention relates generally to optical detectors and more particularly to a device that operates to detect fluid leaks and to detect the position or movement of a body within a fluid control device such as a pump or valve.

2. Brief Description of the Prior Art

The present invention incorporates an optical fluid leak detection device and an optical position detection device within a single detector. Although it is primarily designed for use with fluid pumps as a means to optically detect both the movement of the internal pumping mechanism and to detect fluid leaks within the pump, the device has application in many types of pumps, valves and in devices which interact with fluids. An optical fluid leak detector that is generally similar to the optical leak detector portion of the present invention is disclosed in prior U.S. Pat. Nos. 4,901,751 and 5,062,770 and copending U.S. patent application Ser. No. 07/366,729 and 07/393,142, all assigned to the assignee of the present application.

No prior art is known to the inventors which combines an optical leak sensor with an optical position detector in a single probe device, whereby the operating status of a pump (or other device) may be determined. The preferred embodiment of the present invention comprises an improved device for assuring the purity and quality of liquids that pass through fluid handling devices, such as pumps and valves. It therefore provides for a cleaner environment with regard to the purity of fluids, such as water and blood plasma which must be protected from contamination due to leaking pumps and valves during processing.

SUMMARY OF THE INVENTION

It is an object of the present invention to provide a single sensor which integrates the two functions of leak detection and component motion sensing.

It is another object of the present invention to provide a sensor that is composed of chemically inert materials, such that any chemical that is contacted by the sensor will not corrode the sensor, nor will the sensor contaminate the chemical.

It is a further object of the present invention to provide a sensor having no electrical or electronic components disposed in proximity to the chemicals that are disposed within a pumping system.

It is yet another object of the present invention to provide a sensor which includes optical sensing of both device motion and fluid leakage.

It is yet a further object of the present invention to provide a sensor which is composed of two portions, whereby a first portion may remain in a sealing position within a pump or other device, and a second portion may be removed for adjustment or replacement.

It is still another object of the present invention to provide a sensor which positively determines that a fluid handling device is operating properly and not leaking, whereby the purity and noncontamination of a fluid passing through the fluid handling device is assured.

It is still a further object of the present invention to provide a sensor which is utilized in a fluid handling device to assure the environmental cleanliness and safety of the device and to guard against contamination of the fluid passing through the fluid handling device.

The sensor of the present invention includes a generally hollow body having a sealed forward end that is designed to be mounted in an opening formed within a fluid handling device such as a pump or valve. Disposed within the hollow body of the sensor are a liquid leak detection optical system and a motion sensing optical system. In the preferred embodiment, the optical sensing systems are removably engaged within the hollow body, such that the hollow body can remain inserted within the fluid handling device, whereby the device can remain operational and the optical components can be removed, checked and replaced if need be.

It is an advantage of the present invention that it provides a single sensor which integrates the two functions of leak detection and component motion sensing.

It is another advantage of the present invention that it provides a sensor that is composed of chemically inert materials, such that any chemical that is contacted by the sensor will not corrode the sensor, nor will the sensor contaminate the chemical.

It is a further advantage of the present invention that it provides a sensor having no electrical or electronic components disposed in proximity to the chemicals that are disposed within a pumping system.

It is yet another advantage of the present invention that it provides a sensor which includes optical sensing of both device motion and fluid leakage.

It is yet a further advantage of the present invention that it provides a sensor which is composed of two portions, whereby a first portion may remain in a sealing position within a pump or other device, and a second portion may be removed for adjustment or replacement.

It is still another advantage of the present invention that it provides a sensor which positively determines that a fluid handling device is operating properly and not leaking, whereby the purity and noncontamination of a fluid passing through the fluid handling device is assured.

It is still a further advantage of the present invention that it provides a sensor which is utilized in a fluid handling device to assure the environmental cleanliness and safety of the device and to guard against contamination of the fluid passing through the fluid handling device. These and other objects, features and advantages of the present invention will become apparent to those of ordinary skill in the art upon review of the following detailed description of the invention.

IN THE DRAWING

FIG. 1 is a schematic diagram of a sensor system, including the sensor of the present invention;

FIG. 2 is a side elevational view of the sensor of the present invention;

FIG. 3 is a front end elevational view of the sensor of the present invention;

FIG. 4 is a side cross-sectional view of the sensor depicted in FIGS. 2 and 3, taken along lines 4—4 of FIG. 3;

DETAILED DESCRIPTION OF THE PREFERRED EMBODIMENT

Figure 5:
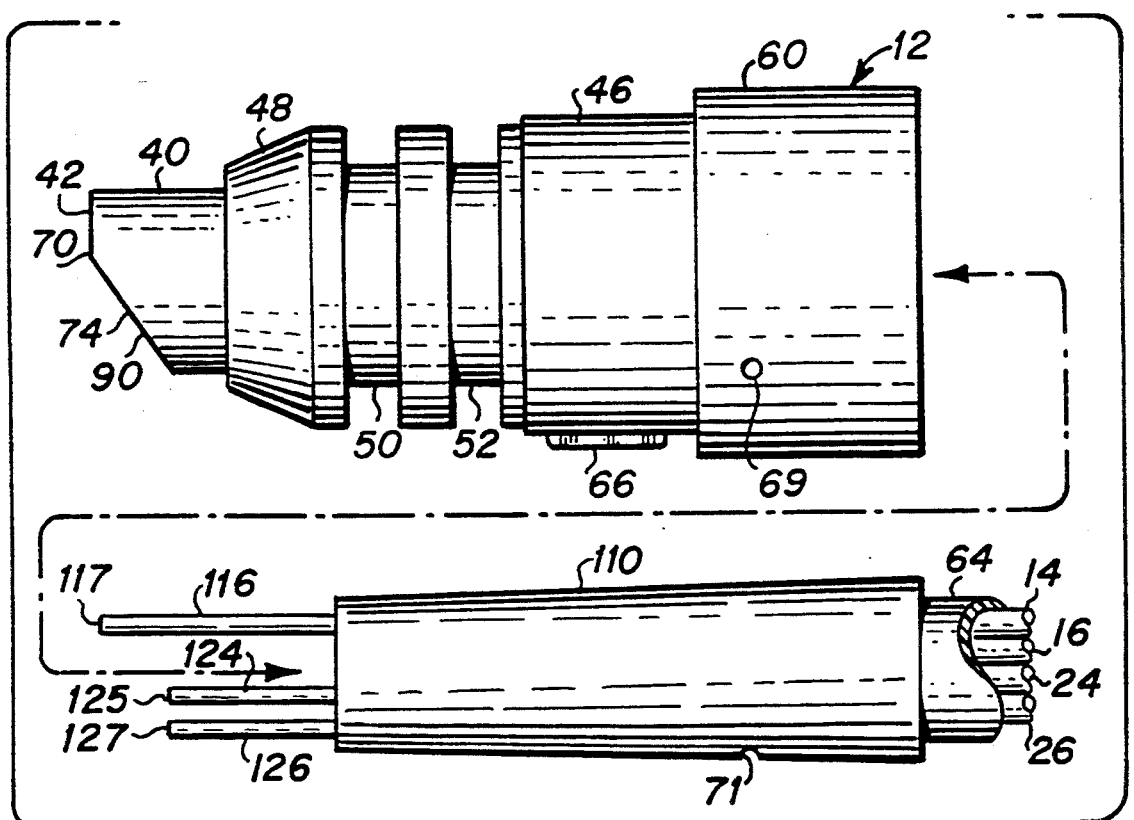
FIG. 5 is an exploded view of the present invention depicting the forward plug portion thereof and the internal optical component portion thereof.

As depicted in FIG. 1, the optical leak sensor and position detector 10 of the present invention includes a detector body or plug 12 having optical leak sensor components (not shown) and optical position sensing components (not shown) disposed therewithin; these optical leak sensor components and optical position detector components are discussed in detail hereinafter. A fiberoptic emitter line 14 and a fiberoptic receiver line 16 are engaged to the optical position sensing components disposed within the plug 12. The fiberoptic cables 14 and 16 are engaged to an electro-optical transceiver device 18 which functions to transmit light along the emitter fiber 14 and receive light along the receiver fiber 16 and to emit electrical signals, indicative of the reception of the light, through electrical lines 20 to a controller 22. In a similar manner, an optical emitter cable 24 and an optical receiver cable 26 are engaged to the leak detection components within the plug 12. The emitter and receiver cables 24 and 26 respectfully are engaged to an electro-optical transceiver device 28, which in the preferred embodiment is identical to the electro-optical transceiver 18. The electro-optical transceiver 28 is connected by electrical wires 30 to the controller 22, whereby optical signals received by the transceiver 28 that indicate the detection of a leak by the leak detecting components within the plug 12 are converted to electrical signals by the electro-optical transceiver 28. The electrical signals are then transmitted along electrical lines 30 to the controller 22 to cause the activation of an alarm or other warning device. In the preferred embodiment, the electro-optical transceiver devices 18 and 28 are manufactured by Banner Engineering, model number SM312FP, identified by the Banner Engineering trademark MINIBEAM.

The plug 12 and the optical components disposed therewithin are depicted in FIGS. 2, 3, 4 and 5; wherein FIG. 2 is a side elevational view, FIG. 3 is an end elevational view, FIG. 4 is a side cross-sectional view taken along lines 4—4 of FIG. 3 and FIG. 5 is an exploded view of the plug 12.

As depicted in FIGS. 2, 3, 4 and 5, the plug 12 is a generally cylindrical member having a forward cylindrical portion 40 which terminates in a solid front face 42. The plug 12 includes a generally cylindrical body portion 46 which includes a forward section 48 that tapers inwardly towards the front section 40 and two 0-ring grooves 50 and 52 that are disposed circumferentially within the body portion 46. An elongated narrow key element 66 projects outwardly from the outer surface of the body portion 46 to align the plug 12 correctly within a sensor insertion bore formed in the body of a fluid control device, as is discussed in further detail hereinbelow. The plug 12 also includes a cylindrical rearward portion 60 that has a larger diameter than the body portion 46. In the preferred embodiment, the plug sections 40, 42, 46, 48 and 60 are integrally molded in one piece. An optical cable 64 containing the four fiberoptic lines 14, 16, 24 and 26 projects rearwardly from the rearward portion 60 of the plug 12. An L-shaped locking pin 68 projects inwardly through a pin bore 69 formed in the rearward portion 60. As is best seen in FIG. 5, the bore 69 is positioned such that it forms a notch 71 in the outer surface of the bushing 110. The pin 68 resides within the notch 71 when the bushing 110 is disposed within the plug 12. The pin 68 thus serves to engage the outer and inner portions of the plug 12 together, as is discussed hereinbelow.

As is best seen with the aid of FIGS. 2 and 3, the front face 42 is preferably formed with an upper portion 70 which comprises a flat surface that is generally perpendicular to the sides of the cylindrical forward portion 40, and a lower generally flat surface 74 that is disposed at a rearwardly depending angle relative to the surface 70. A generally circular position detector optical emitter window 80 and a generally circular position detector optical receiver window 82 are formed in the upper surface portion 70 of the front face 42. A generally circular leak-detection window 90 is formed in the lower surface portion 74 of the front face 42.

The internal components of the plug 12 are depicted in FIGS. 4 and 5. As depicted in FIG. 4, a connector bore 92 is formed along the center line of the cylindrical body 12 from the rearward portion 60 to approximately the location of the tapered surface 48. Two position detector optical fiber bores, one 94 of which is shown in phantom in FIG. 4, project forwardly from the frontward end 96 of the bore 92 to each of the windows 80 and 82. A larger diameter single optical fiber bore 98 projects forwardly from the front surface 96 of the bore 92 to the leak detector window 90.

A cylindrical, hollow-bored fiberoptic cable connector bushing 110 is removably engaged within the bore 92. The four optical fibers 14, 16, 24 and 26 are fixedly engaged within the bushing 110, such as by clamping or epoxy 112, in a predetermined orientation. As depicted in FIGS. 4 and 5, the predetermined orientation of the optical fibers is such that the forward end 114 of the position detector emitter optical fiber 14 projects forwardly from the bushing 110 into the optical fiber bore 94 with such a length of forward extension that the tip 115 of the optical fiber 114 rests immediately proximate the emitter window 80. Likewise, the frontward end 116 of the position detector receiver optical fiber 16 projects forwardly from the bushing 110 within its optical fiber bore, such that the tip 117 of the optical fiber end 116 rests immediately proximate the receiver window 82.

A forward projecting end 124 of the leak detector emitter optical fiber 24 projects forwardly from the bushing 110 within the bore 98, such that the tip 125 of the emitter end 124 resides proximate an upper portion 130 of the optical window 90. In like manner, a forwardly projecting end 126 of the leak detector receiver optical fiber 26 projects within the bore 98, such that the tip 127 of the end 126 rests proximate a lower portion 132 of the window 90.

As is best seen in FIG. 4, the leak detector window 90 is formed with an upper surfaced portion 130 and a lower surfaced portion 132. The two surfaces 130 and 132 are formed such that an angle of approximately 90 degrees is formed at the intersection of the two surfaces 130 and 132, and the surfaces 130 and 132 are generally disposed at 45 degrees from the optical fiber ends 124 and 126 respectively. It is therefore to be understood that light emitted by the leak detector emitter optical fiber tip 125 will reflect downwardly from the first surface 130 towards the second surface 132 and then rearwardly from the surface 132 to the tip 127 of the leak detector receiver optical fiber 26. However, should a fluid come in contact with the window 90, it will cause a change in the optical path of the reflecting beam due to the different index of refraction of the fluid from air at the exterior surface of window 90, whereby the light beam from the emitter tip 125 will no longer be received at the receiver tip 127. When this condition occurs, the electro-optical transceiver 28 ceases sending electrical signals to the controller 22 and an alarm is sounded which indicates that fluid has contacted the window 90 as an indication of a leak in the fluid handling device into which the detector plug 12 is inserted. The thickness of window 90, and particularly the window section 132, must be such that the window can withstand the relatively high pressure that is sometimes generated within a fluid handling device, yet thin enough to provide good optical refraction characteristics when a leaking fluid contacts the exterior surface of the window. In the preferred embodiment, a window thickness for window 90 of approximately 0.02 inches through 0.04 inches is utilized.

With regard to the position detecting optical sensor portion of the device, light emitted through the emitter window 80 is directed upon a reflective surface 140 of a moving component of the fluid handling device, such that light is reflected by the surface 140 to the window 82 of the receiver optical fiber 16. Thereafter, when the reflecting surface 140 of the moving component of the fluid handling device is moved, the reflection therefrom will cease and light will cease to be received through the window 82; thus indicating that the surface 140 within the fluid handling device is actually moving. Such an appropriate surface 140 might be a portion of a valve stem, or diaphragm, or other moving component which will positively indicate that the component is in one position (open) or another (closed) or reciprocating at a given frequency. The thickness of the windows 80 and 82, in the preferred embodiment, is from 0.02 inches to 0.04 inches, whereby the passage of light through the windows is sufficiently strong yet the windows can withstand a relatively high internal pressure within the fluid handling device.

Figure 6:
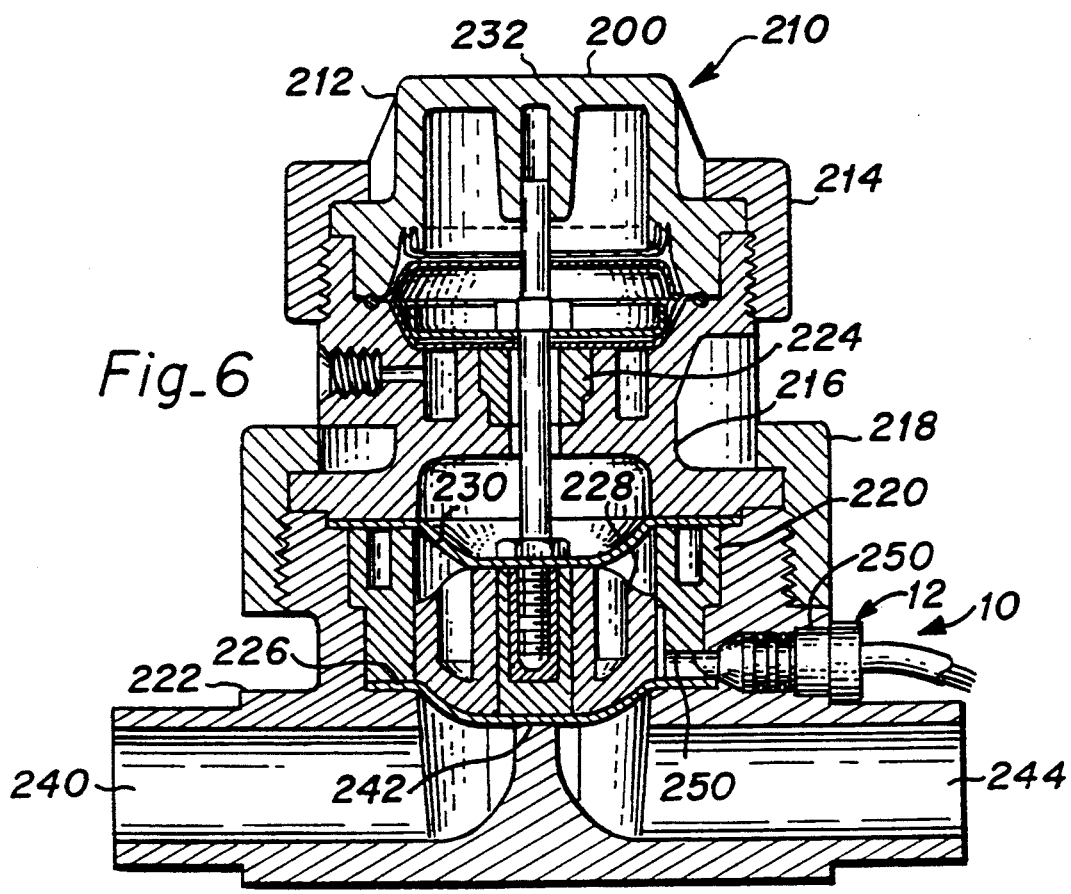
FIG. 6 is a side cross-sectional view of a weir valve showing the present invention engaged therewithin.

FIG. 6 is a side cross-sectional view of a fluid handling device (a weir valve) 200 which incorporates the plug 12 of the present invention, to create a fluid handling system 210. The components of the general weir valve are well known, and include a housing 212, an upper nut 214, an upper body 216, a main nut 218, an inner ring 220, a lower body 222, an internal bushing 224, a primary diaphragm 226, a moveable valve element or puck 228, a secondary diaphragm 230 and a button indicator 232. As is well known, when the puck 228 moves upwardly, fluid in the upstream end 240 of the valve is permitted to pass through the valve opening 242 to the downstream end 244 of the valve. The secondary diaphragm 230 provides a backup leak protection device in the event that the primary diaphragm 226 is breached, whereby fluid would be permitted to enter the normally dry area of the valve in which the puck resides between the two diaphragms 226 and 230.

A sensor bore 250 is formed through a portion of the lower body 222 to hold the plug 12. To permit the sensor 10 to have access to the puck chamber area between the primary diaphragm 226 and secondary diaphragm 230, a window bore 260 is formed through the inner ring 220, such that light from the emitter window 80 will strike a side surface of the puck 228. It is therefore to be realized that when the puck is in the lower position depicted in FIG. 6, light will be reflected back to the receiver window 82; however, when the puck is in an upward position the emitter light will no longer strike the side surface of the puck and no signal will be reflected back to the receiver window. By this means the position of the puck 228 (open or closed) can be assured. It should be noted that a roughened or nonreflective portion of the surface of the puck 228 may be placed adjacent the reflective portion, such that the position of the puck could likewise be determined. It is also to be understood that a reciprocating motion of the puck 228 will be detected as a series of light pulses by the receiver line 16, and that these pulses can be counted to provide a determination of the number of cycles that the puck has made. Such a determination is useful in determining the usage and life expectancy of reciprocating components of a fluid handling device such as a pump or valve. The window passage 260 also serves to conduct any leaking fluid that is resident between the primary diaphragm 226 and the secondary diaphragm 230 to the leak detecting window 90 of the plug 12. As explained hereinabove, when the window 90 is contacted by a fluid, the index of refraction of the fluid disrupts the reflecting leak detection optical signal, such that the presence of the fluid becomes known. In the preferred embodiment, the plug 12, as well as the components of a fluid handling device 200 are composed of a chemically inert material such as PFA (polyfluoroaloxyl plastic material), although other suitable materials may also be used.

It is therefore to be understood that a fluid handling system 210, including a sensor 10 of the present invention within a fluid handling device 200, provides increased environmental safety. Such a system can determine positively whether a valve is open or closed in a situation where a valve stem may be broken, where to all outward appearances the valve may appear open when the puck 228 is actually in the closed position, or vice versa. The device thus assures that fluid movement and perhaps contamination will not occur through a false indication regarding the position of a fluid handling device. Likewise, the system includes a leak detection feature which provides a positive indication of the failure of a primary diaphragm, alerting the operator to the necessity for replacing the fluid handling component prior to the failure of a secondary diaphragm and the contamination of the fluid with hydrocarbon lubricants or other components present in the fluid handling device. This feature serves to assure the purity of the fluid passing through the valve and prevent unwanted and perhaps costly contamination.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

What I claim is:

1. A sensor for detecting fluid leaks and the position of a moving component within a fluid handling device, comprising:

a body member, said body member including a detector bore formed therein;

a position sensor means, said position sensor means including an optical emitter and receiver means being engaged within said detector bore of said body member and functioning to emit and receive optical signals indicative of the position of a movable member within a fluid handling device and disposed away from said body member;

a leak detection means, said leak detection means being engaged within said detector bore of said body member and functioning to emit and receive optical signals indicative of the contact by a fluid upon an exterior surface of said body member.

2. A sensor as described in claim 1 wherein said body member further includes an optical signal emitter window and an optical signal receiver window, said emitter window and said receiver window being disposed at an inward end of said detector bore; said emitter window functioning to permit the emission of an optical signal therethrough and outwardly from said body member, and said receiver window functioning to permit and external optical signal to be received therethrough and inwardly into said body member.

3. A sensor as described in claim 2 wherein an emitter optical fiber is disposed within said detector bore of said body member proximate said emitter window, and a receiver optical fiber is disposed within said detector bore of said body member proximate said receiver window.

4. A sensor as described in claim 3 wherein said emitter optical fiber and said receiver optical fiber are engaged to an electro-optical transceiver, whereby the emission and reception of said optical signals are converted to electrical signals by said transceiver.

5. A sensor as described in claim 1 wherein said body member further includes a leak detection window formed at an inward end of said detector bore;
said leak detection means further including a light emitter optical fiber and light receiver optical fiber, said emitter optical fiber and said receiver optical fiber disposed within said detector bore;
said window being disposed relative to said emitter optical fiber and receiver optical fiber such that optical signals emitted by said emitter optical fiber will be reflected by said window and received by said receiver optical fiber.

6. A sensor as described in claim 5 wherein said emitter optical fiber and said receiver optical fiber are engaged to an electro-optical transceiver, such that said optical signals are converted into electrical signals by said transceiver.

7. A fluid control system, comprising:
a fluid control means operative to control the passage of fluid therethrough;
a sensor means, said sensor means being engaged to said fluid control means and operative to sense the operating condition of said fluid control means and whether said fluid control means is leaking;
said sensor means including:
a body member, said body member including a detector bore formed therein;
a position sensor means, said position sensor means including an optical emitter and receiver means being engaged within said detector bore of said body member and functioning to emit and receive optical signals indicative of the position of a movable member disposed away from said body member;
a leak detection means, said leak detection means being engaged within said detector bore of said body member and functioning to emit and receive optical signals indicative of the contact by a fluid upon an exterior surface of said body member.

8. A fluid control system as described in claim 7 wherein said body member further includes an optical signal emitting window and an optical signal receiving window, said emitting window and said receiving window being disposed at an inward end of said detector bore; said emitting window functioning to permit the emission of an optical signal therethrough and outwardly from said body member, and said receiver window functioning to permit an external optical signal to be received therethrough and inwardly into said body member.

9. A fluid control system as described in claim 8 wherein an emitting optical fiber is disposed within said detector bore of said body member proximate said emitting window, and a receiver optical fiber is disposed within said detector bore of said body member proximate said receiver window.

10. A fluid control system as described in claim 9 wherein said emitter optical fiber and said receiver optical fiber are engaged to an electro-optical transceiver, whereby the emission and reception of said optical signals are converted to electrical signals by said transceiver.

11. A fluid control system as described in claim 7 wherein said body member further includes a leak detection window formed at an inward end of said detector bore;
said leak detection means further including a light emitting optical fiber and light receiving optical fiber, said emitting optical fiber and said receiving optical fiber being disposed within said detector bore;
said window being disposed relative to said emitting optical fiber and receiver optical fiber such that optical signals emitted by said emitter optical fiber will be reflected by said window and received by said receiver optical fiber.

12. A fluid control system as described in claim 11 wherein said emitting optical fiber and said receiving optical fiber are engaged to an electro-optical transceiver, such that said optical signals are converted into electrical signals indicative thereof.

13. A sensor for detecting fluid leaks and the position of a moving component within a fluid handling device, comprising:
a body member, said body member including a detector bore formed therein;
an optical fiber holding member, being removably engageable within said detector bore;
a position sensor means, said position sensor means including a position optical fiber emitter and a position optical fiber receiver, said position optical fiber emitter and position optical fiber receiver being engaged within said optical fiber holding member and functioning to emit and receive optical signals indicative to the position of a movable member within a fluid handling device and disposed away from said body member;
a leak detection means, including a leak detection optical fiber emitter and a leak detection optical fiber receiver, each said leak detection optical fiber emitter and leak detection optical fiber receiver being engaged within said optical fiber holding member and functioning to emit and receive optical signals indicative of the contact by a fluid upon an exterior surface of said body member.

14. A sensor as described in claim 13 wherein said body member further includes a position optical signal emitter window and a position optical signal receiver window, said emitter window and said receiver window being disposed at an inward end of said detector bore; said emitter window functioning to permit the emission of a position optical signal therethrough and outwardly from said body member, and said receiver window functioning to permit an external position optical signal to be received therethrough and inwardly into said body member.

15. A sensor a s described in claim 14 wherein said body member further includes a leak detection window formed at an inward end of said detector bore;

said leak detection window being disposed relative to said leak detection emitter optical fiber and leak detection receiver optical fiber such that optical signals emitted by said leak detection emitter optical fiber will be reflected by said window and received by said leak detection receiver optical fiber.

16. A fluid control system, comprising:

a fluid control means operative to control the passage of fluid therethrough;

a sensor means, said sensor means being engaged to said fluid control means and operative to sense the operating condition of said fluid control means and whether said fluid control means is leaking;

said sensor means including:

a body member, said body member including a detector bore formed therein;

an optical fiber holding member, being removably engageable within said detector bore;

a position sensor means, said position sensor means including a position optical fiber emitter and a position optical fiber receiver, said position optical fiber emitter and position optical fiber receiver being engaged within said optical fiber holding member and functioning to emit and receive optical signals indicative to the position of a movable member disposed away from said body member;

a leak detection means, including a leak detection optical fiber emitter and a leak detection optical fiber receiver, each said leak detection optical fiber emitter and leak detection optical fiber receiver being engaged within said optical fiber holding member and functioning to emit and receive optical signals indicative of the contact by a fluid upon an exterior surface of said body member.

17. A fluid control system as described in claim 16 wherein said body member further includes a position optical signal emitting window and a position optical signal receiving window, said emitting window and said receiving window being disposed at an inward end of said detector bore; said emitting window functioning to permit the emission of a position optical signal therethrough and outwardly from said body member, and said receiver window functioning to permit an external position optical signal to be received therethrough and inwardly into said body member.

18. A fluid control system as described in claim 17 wherein said body member further includes a leak detection window formed at an inward end of said detector bore;

said leak detection window being disposed relative to said leak detection emitting optical fiber and leak detection receiving optical fiber such that optical signals emitted by said leak detection emitting optical fiber will be reflected by said window and received by said leak detection receiving optical fiber.

* * * * *